Oct. 28, 1969  CHIKARA HAYASHI  3,475,034
GAS-TIGHT SEAL
Filed Feb. 21, 1967  3 Sheets-Sheet 2

United States Patent Office

3,475,034
Patented Oct. 28, 1969

1

3,475,034
GAS-TIGHT SEAL
Chikara Hayashi, 146 Kikuna-cho, Kohoku-ku,
Yokohama-shi, Japan
Filed Feb. 21, 1967, Ser. No. 617,554
Claims priority, application Japan, Feb. 24, 1966,
41/10,792
Int. Cl. F16j 15/40, 53/00; B65d 53/06
U.S. Cl. 277—70                      4 Claims

ABSTRACT OF THE DISCLOSURE

This invention relates to a gas-tight seal for an opening formed in a partition between two chambers, one of which being maintained at the atmospheric pressure, the other being maintained at lower pressure than that of the former. The gas-tight seal includes an ejector means having a nozzle surrounding the opening. By ejecting a working fluid from the nozzle, the flow of gas from the high pressure chamber through the opening into the low pressure chamber is prevented, thus the sealing off of the opening is effected, while the opening permits a lengthy article such as a strip or wire to pass therethrough.

BACKGROUND OF THE INVENTION

This invention relates to a gas-tight seal or seal assembly, particularly to sealing means for an opening formed in a partition between two chambers for permitting a continuous material such as a strip, wire or elongated rod to successively or intermittently pass through the opening, but to prevent gas communication between two chambers separated by the partition so that the two chambers may be maintained at their respective, different pressures.

Previous seal means used for such purpose comprises a ring-like member whose outer edge is secured to or arranged to always contact with the peripheral portion of the opening, and its inner edge is formed to encircle the transverse section of the continuous material passing through the opening in the contact relationship therewith, or in leaving a clearance which is narrow enough to maintain the original pressure difference between two chambers or regions. In the form of contacting the inner edge of the seal ring with the material, a relatively large contact pressure is required to obtain an effective sealing there. Consequently, by this contact pressure the outer surface of the material and the inner peripheral edge of the seal will be liable to be damaged. In the form of leaving a narrow clearance between the inner edge of the seal ring and the surface of the material, the maintenance of such a narrow clearance at all time is very difficult in practice. In addition, either of the seals mentioned above has unhandiness such that even if the dimension of the cross section of the material to be newly transferred is slightly altered, the seal should be replaced by one adapted to the new material on all such occasions, and also that because there is some case where the feeding operations of material is temporarily interrupted, and the last end of the preceding material leaves the opening, it is indispensable to provide valve means to close the opening.

Therefore, it is an object of the present invention to provide a novel sealing means able to obviate the disadvantages or unhandinesses of the prior seal means as above mentioned. The principal part of the invention is to provide the jet portion of a fluid operated ejector around the opening in the partition. When the working fluid of the ejector is ejected from the low pressure section or region towards the high pressure section or region, owing to its pumping action, the pressure differential between the two sections may be positively maintained, and thus the continuous material may be transferred from the low pressure section to the high pressure section without being subjected to the difficulties caused from the constructions of the prior seals.

Another essential part of the invention is to use condensable fluid for the working fluid of the ejector and to provide cooling means in the low pressure section adjacent the opening for condensing the working fluid. With this arrangement, even if a portion of the fluid in the high pressure section flows into the low pressure section, the great portion of the fluid will be readily condensed into liquid by means of the cooling means because of being the condensable fluid, and in consequence the pressure in the low pressure section is maintained at a low pressure corresponding to the maximum vapour pressure of the working fluid substantially determined by the temperature of the cooling means. By this function, the cooling means of the present invention, in cooperation with the ejector above mentioned, serves as a pump to maintain the low pressure section at a predetermined low pressure. Therefore, according to the present invention, the number of pumps required for the maintenance of the low pressure will be reduced, and further, in some cases all of such pumps may be removed from the apparatus.

The object and function of the invention will be apparent from the following description with reference to the drawings.

Description of preferred embodiments

Figure 1:
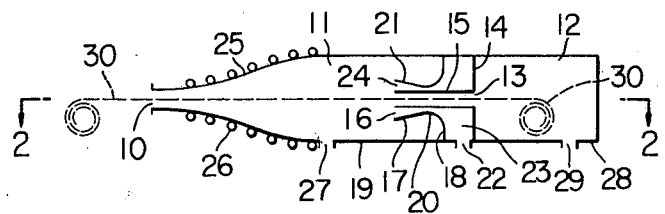
FIG. 1 shows a diagrammatic vertical section of a preferable embodiment of the invention.

Referring to FIG. 1, the sealing means diagrammatically shown therein comprises an inlet port 10 through which a first region or chamber 11 communicates with the atmosphere. At the rear end of the first chamber is provided a partition 14 defining a second region or chamber 12 to be maintained at a lower pressure than that of the first chamber 11. The partition 14 includes an elongated tubular member 15 extending from an opening 13 formed in the partition 14 towards the inlet port 10 some distance. The tubular member 15 is fixed at its one end to the periphery of the opening 13 by means of welding. In the first chamber 11 there is provided a jet wall 17 surrounding the tubular member 15 and away from the partition 14. The jet wall 21 is jointed at its rear end 18 to the inner surface of the rear peripheral wall 19 of the first chamber 11 and extends inwardly, bending at a place near the tubular member 15, converging until passing a throat 20, then gradually diverging and terminates at the front end 16 of the tubular member 15. In the rear peripheral wall portion between the rear end 18 of the jet wall 21 and the patrition 14 is provided a steam inlet 22 which is connected through a pipe line to a boiler (not illustrated). The portion of the jet wall 21 between the rear end 18 and the throat 20 thereof, the peripheral wall 19 and the partition 14 define a steam chamber 23 included in the first chamber 11, and the other portion of the jet wall between the throat 20 and the front end 21 of the jet wall 17 defines an annular nozzle 24 in association with the front portion 16 of the tubular member 15.

A peripheral wall 25 defining the front portion of the first chamber 11 is preferably converged, and mounted on the outer surface thereof is a cooling means 26 connected to a cooling source such as a cooling pump (not illustrated), and a condensed steam drain port 27 is provided at a position adjacent the rear end of the converged wall 25.

The second chamber 12 is provided at the rear portion of its peripheral wall 28 with an exhaust port 29 connected to an evacuation means (not illustrated) thereby to evacuate the second chamber to a low pressure or vacuum.

Figure 2:
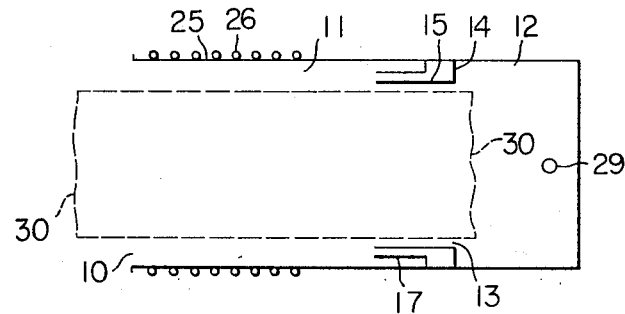
FIG. 2 is a diagrammatic plan view taken along the line 2—2 in FIG. 1.
Figure 3:
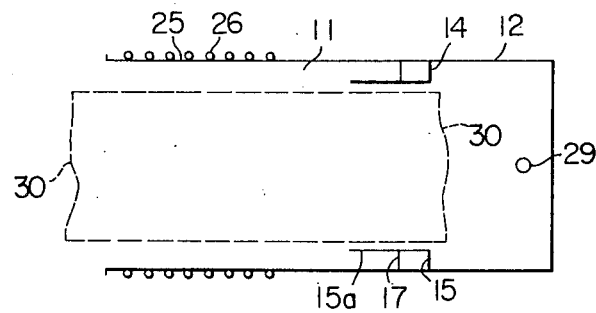
FIG. 3 is a diagrammatic plan view similar to FIG. 2, but differs in part in the construction.

The configurations of the longitudinal and transverse cross sections of the first and second chambers 11 and 12, tubular member 15 and jet wall 17 are determined to accommodate to the article to be handled. For example, in case of handling an article 30 like wire, the vertical sections of the members are as illustrated in FIG. 1 and their respective transverse sections are of circular, while in case of handling an article like strip, the vertical sections of the members are substantially similar to FIG. 1, but their respective horizontal sections are as illustrated in FIGS. 2 or 3. In the latter case, the chambers 11 and 12 and the tubular member 15 are of rectangle in transverse cross sections, and the jet wall 17 also is of rectangle, but its upper and lower surfaces extend outwards, but both sides thereof are vertical. Referring to FIG. 3 there is shown an arrangement wherein the vertical walls of the jet wall 17 and the tubular member 15 are formed by a single common wall.

Describing the operation of the apparatus shown in FIG. 1, steam maintained at, for example, 1 to 7 atmospheric pressures is introduced into the steam chamber through the steam inlet 22 and from the boiler, and coolant such as a cooling water of 1° C. to 10° C. is supplied from its source to the cooling means 25, then the steam is ejected from the nozzle 24 into the first chamber 11, and the ejected steam will impinge upon the peripheral wall 25 being cooled by the cooling means 26 and is condensed thereon. The condensed steam is discharged through the drain port 27 to the outside of the apparatus. Summarizing this function, it may be said that the first chamber 11 includes a type of a steam ejector with a surface condenser. With this construction, the gas in the first chamber 11, especially the gas adjacent the nozzle is forced by the pumping action of the ejector to the inlet port 10. Simultaneously with the ejection of steam, the evacuation means connected to the exhaust port is operated to evacuate the gas in the second chamber 12 thereby to reduce the pressure therein. Owing to the reduction of pressure, a part of the gas in the first chamber 11 tends to flow into the second chamber 12 past through the tubular member 15. However, the inflow of the gas into the tubular member 13 may be checked by predetermining the capacity of the ejector located in the first chamber 11 in such a manner that the volume of the gas displaced from the first chamber 11 by the action of the ejector is equal to the volume of the gas flowing from the first chamber 11 into the tubular member that is caused from the pressure differential between the chambers 11 and 12. Consequently, the second chamber 12 may be evacuated and maintained at a predetermined low pressure or vacuum pressure by displacing the volume of gas substantially equal to the volume of gas effected in an ordinary closed chamber.

It is obvious that an ejector of greater capacity may be used. In this case the apparent volume displacement by the evacuation means connected to the exhaust port 29 will become increased. On the contrary, when the capacity of the ejector is of deficiency, the apparent volume displacement by the evacuation means will become less, but the evacuation of the second chamber 12 may be effected. However, the preferable operation is generally expected in using an ejector whose displacement capacity is slightly greater than or equal to the volume of gas tending to enter the second chamber 12 owing to its lower pressure, thereby substantially sealing the opening 13.

As is seen from the foregoing, the sealing operation is effected with the inlet port 10 and the tubular member 15 being open, consequently a continuous article 30 may be transferred from the outside of the apparatus under the atmospheric pressure through the inlet port, the first chamber 11, the tubular member 15 and the opening 13 into second chamber 12 under vacuum pressure without any restriction. It is obvious that the continuous article 30 may be transferred in the opposite direction, namely, from the second chamber 12 to the outside of the apparatus.

Figure 4:
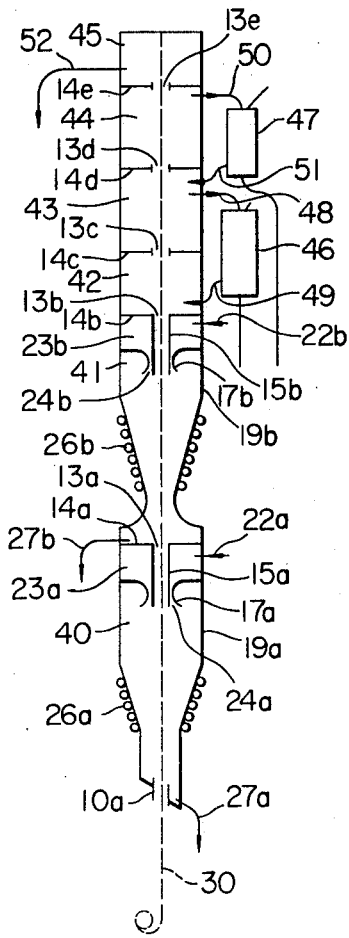
FIG. 4 is a diagrammatic vertical sectional view of a modification of the invention.

A modification of the present invention shown in FIG. 4 comprises vertically aligned first chamber 40, second chamber 41, third chamber 42, fourth chamber 43, fifth chamber 44 and sixth chamber 45. The first chamber 40 has at its lower end an inlet port 10a, and mounted between the first and second chambers 40 and 41, the second and third chambers 41 and 42, the third and fourth chambers 42 and 43, the fourth and fifth chambers 43 and 44 and the fifth and sixth chambers 44 and 45 are partitions 14a, 14b, 14c, 14d and 14e respectively. These partitions are provided with openings 13a, 13b, 13c, 13d and 13e respectively aligned on the vertical axis of the opening 10a. Since the first and second chambers 40 and 41 are substantially similar in construction to the first and second chambers 11 and 12 shown in FIG. 1, the parts of the former corresponding to those of the latter are designated by the same numerals with suffix such as "a" and "b" and the explanations of the functions thereof are omitted.

To the end of providing a gas-tight seal between the adjacent chambers in the series of from the third chamber 42 to the fifth chamber 44, ordinary steam ejectors with barometric condensers 46 and 47 are located outside of the chamber and connected to the chambers in such a manner that inlet pipe 48 and outlet pipe 49 of the first steam ejector 46 are connected to the fourth chamber 43 and the third chamber 42 respectively, and inlet pipe 50 and outlet pipe 51 are connected to the fifth chamber 44 and the fourth chamber 43 respectively. The sixth chamber 45 is connected to a high vacuum pumping system, for example, the combined diffusion pump and rotary pump (not shown) through an exhaust pipe line 52.

The steam ejector with surface condenser mounted in the first chamber 40 and comprised of steam inlet 22a, tubular member 15a, jet wall 17a and additional surface condensing means 26a, serves to sealingly separate the second chamber 41 from the first chamber 40 communicating with the atmosphere. The steam ejector mounted in the second chamber 41 and comprised of steam inlet 22b, tubular member 15b and jet wall 17a serves to seal the third chamber 42 against the second chamber 41, and simultaneously to maintain the pressure in the third pressure 42 lower than that in the second chamber 41. The first ejector 46 is designed to have gas evacuating speeds exceeding the volume of gas entering from the fourth chamber 43 through the opening 13c into the third chamber 43, in consequence the ejector 46 works to back the gas entering the fourth chamber 43 to the third chamber 42 thereby to substantially seal the opening 13c and in addition, to maintain the fourth chamber 43 at the pressure lower than that of the third chamber 42 by virtue of the excess displacing power. The second ejector 47 also operates to substantially seal the opening 13d and evacuate the fifth chamber 44.

By providing each chamber or each pair of adjacent chambers with an ejector and operating them simultaneously as described above, the sixth chamber 45 may be completely isolated from the atmosphere and highly pre-evacuated. Therefore, upon starting the vacuum pumping system connected to the exhaust pipe line 52, the sixth chamber 45 will be evacuated to a high vacuum pressure under a sealed condition and maintained at its pressure. With this arrangement, a continuous article 30 may be freely transferred from the atmosphere through the inlet port 10a and the openings 13a, 13b, 13c, 13d and 13e into the sixth chamber 45 of high vacuum, or freely backed from the sixth chamber 45 to the atmosphere.

The reason for positioning the ejectors 22a–15a–17a–26a and 22b–15b–17b–26b at the area near the inlet port 10a and the ejectors 46 and 47 at the area remote from the inlet port 10a is to aim at that the former ejectors effect a principal sealing, while the latter ejectors effect sealings against their corresponding chambers and act at the same time as auxiliary pumping means assisting the function of the vacuum pumping system 52.

Figure 5:
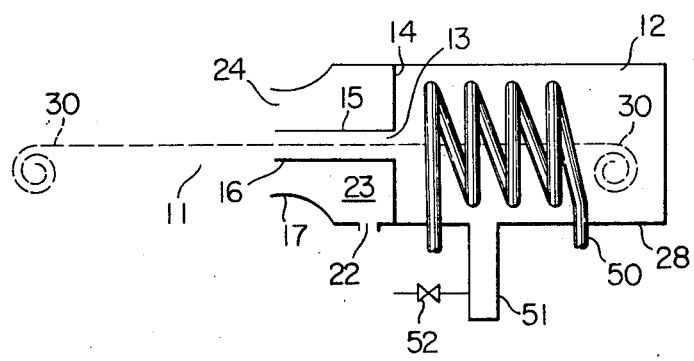
FIGS. 5 to 8 show other modifications of the invention.

FIG. 5 shows another modification that lacks the converged peripheral wall 25, cooling means 26, condensed steam draining port 27 and exhaust port 29 included in the apparatus shown in FIG. 1, but includes a coiled cooling means 50 mounted in the second chamber 12 and a condensed steam draining pipe 51 downwardly extending from the bottom of the peripheral wall 28 of the second chamber 12. The coiled cooling means 50 is located so as not to obstruct the passage of the continuous article 30 and the drain pipe 51 is provided with a valve 52.

In this arrangement, when the steam is ejected through the nozzle 24 to an area 11 named temporarily as the first chamber, the most part of the steam is cooled down by contacting with the air, and the other part thereof enters the second chamber 12 through the opening 13, and is converted into water after cooled by the cooling means 50. The condensed steam is accumulated in the bottom of the drain pipe 51, then discharged out of the drain pipe 51 through the valve 52.

In this arrangement, upon circulating water of 10° C. to 30° C., being accessible, through the coiled cooling means 50 during the operation of the steam ejector, the partial pressure of the steam in the second chamber 12 may be maintained at low pressures such as 10 mm. Hg to 30 mm. Hg, and the partial pressures of the other gases therein become less than the partial pressure of the steam. Therefore, it will be understood that by merely providing a cooling and condensing means within the second chamber 12, a pumping action to reduce the pressure within the second chamber from the atmospheric pressure to a pressure of several ten mm. Hg may be accomplished.

Figure 6:
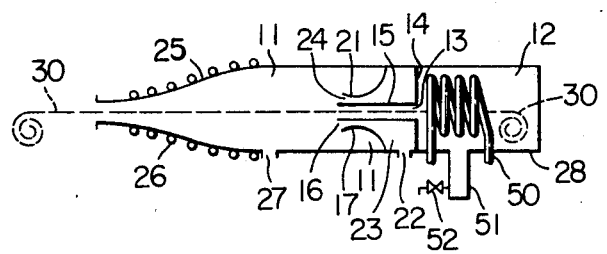

Another modification shown in FIG. 6 is similar to the construction of FIG. 1 with the exception of lacking the exhaust port 29 and including the coiled cooling means 50 and drain pipe 51 with the valve 52 illustrated in FIG. 5. In this arrangement, the steam ejected to the so-called first chamber 11 is cooled and condensed by the cooling means 26, and the steam entering the second chamber 12 is cooled and condensed by the coiled cooling means 50.

A cooling and condensing means similar in function to the coiled cooling means 50 in FIGS. 5 and 6 may be provided for the modification of FIG. 4, though such an illustration is omitted here.

Figure 7:
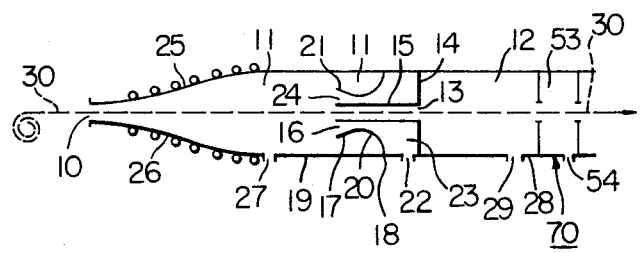

Further, it is noted that mounted at the back of the second chamber 12 illustrated in FIGS. 1 to 3, FIG. 5 or FIG. 6 may be a single or plurality of chambers. An example is shown in FIG. 7 in connection with the apparatus of FIG. 1. As seen therefrom, the second chamber 12 is followed by a chamber 70 including chamber 53 that is designed to be evacuated by a high vacuum pump (not shown) connected to an exhaust port 53. For the apparatus shown in FIGS. 1 to 3 or in FIGS. 5 to 7 condensible gases other than steam may be used as the working fluid.

Some instances where condensible gases other than steam and steam are used as working fluids respectively will be explained here. When a condensible gas other than steam, whose vapor pressure is well low at the temperatures of from 10° C. to 30° C. corresponding to ones of the cooling water, is used in the apparatus of FIG. 5, the second chamber 12 will be evacuated to the pressure substantially equal to the vapor pressure of the condensible gas. When steam is used in the apparatus of FIG. 7, a part of the steam might enter the chamber 70 owing to the high vacuum therein, but the gas remaining in the chamber after evacuated to vacuum pressure such as $10^{-5}$ to $10^{-4}$ mm. Hg by high vacuum pumps is steam for the greater part, as well known in vacuum technique, accordingly even if the steam entering the chamber 70, that will not exert objectionable influences on the article treatment in a high vacuum.

Figure 8:
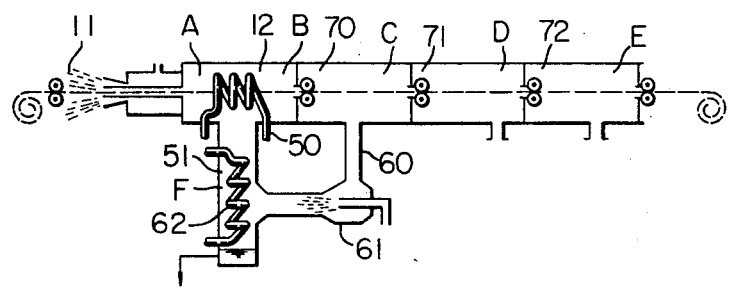

FIG. 8 shows another modification wherein the moisture entering the high vacuum chamber may be nearly or completely removed. As illustrated, chamber 70 is located adjacent to chamber 12 including therein cooling-condensing means 50 and is provided with moisture exhausting pipe 60. Mounted at the lower portion is an auxiliary steam ejector 61 to suck the gas in the pipe 60. The discharging end of the auxiliary steam ejector 61 is connected to a drain reservoir 51 including a second cooling-condensing means 62 to be cooperated with the steam ejector 61. The bottom of the drain reservoir 51 is connected to a suction pump, barometric tail pipe or other suitable means to discharge the drain water accumulated therein. Chambers 71 and 72 following the chamber 70 are designed to be evacuated to the pressures higher than that of the chamber 70.

In this arrangement, the moisture or steam that was not removed by the cooling-condensing means 50 in the chamber 12 will arrive at the chamber 70 with the gas flowing from the chamber 12 into the chamber 70, but the quantity substantially the same as the whole of the gas and steam in the chamber 70 is sucked and ejected into the drain reservoir 51 by the auxiliary steam ejector 61. The ejected steam is cooled and condensed by the second cooling-condensing means 62 and collected at the bottom of the reservoir 61 along with the condensed steam produced by the cooling-condensing means 50 in the chamber 12 and is discharged from there, while the ejected gas flows into the chamber 12.

Summarizing the movements of the gas and steam, the greater part of the gas circulates through the chamber 12, chamber 70, passage 60, steam ejector 61, drain reservoir 50 and chamber 12, while the greater part of the steam that was not condensed in the chamber 12 is removed by the functions of the steam ejector 61 and the cooling-condensing means 62.

An actual example obtained in the operation of the apparatus of FIG. 8 is shown as follows.

| Chamber | Partial Pressure of— | | Total Pressure (mm. Hg) | Measuring Point (Shown in FIG. 8) |
|---|---|---|---|---|
| | Air (mm. Hg) | Steam (mm. Hg) | | |
| 1st Chamber 12 | 2 | 150 | | A |
| | 2 | 25 | | B |
| 2d Chamber 70 | 0.5 | + 3 | | C |
| 3d Chamber 71 | $1\times10^{-3}$ | $1\times10^{-2}$ | | D |
| 4th Chamber 72 | (¹) | (¹) | $10^{-5}$ | E |
| Drain Reservoir 51 | 3 | 25 | | F |

¹ Not measured.

In the above operation, the third and fourth chambers 71 and 72 are evacuated by an oil ejecting pump and oil diffusing pump respectively.

It will be understood that further other modifications of the invention may be worked by, for example, by substituting a barometric condenser for the cooling means 25 of FIG. 1, or directly dispersing the steam from the opening 10 into the atmosphere, or utilizing water as a working fluid in place of steam, or especially utilizing condensible gases in the apparatus of FIGS. 5 and 6, or using cooling agents other than water for the cooling means of FIGS. 5 and 6. It is noted that all these modifications fall within the present invention. On the other hand, in the operation of the apparatus of FIG. 3, if chemicals having an action of cleaning the surface of an article such as trichloroethylene are used as the working fluid of the ejector and directed so as to contact with the continuous articles, the cleaning, bleaching, coloring and ion-activation of the article may be simultaneously accomplished. Besides, the gas-tight seal of the invention may be utilized for providing apparatus comprised of a plurality of vacuum chambers successively aligned and maintained at different pressures through which chambers a continuous article be transferred from an outside area of the apparatus exposed to the atmospheric pressure to the opposite area similarly exposed to the atmospheric pressure. If annealing means and evaporation means are provided in these vacuum chambers respectively, the continuous article may be subjected successively to annealing and evaporation treatments.

What is claimed is:

1. In a vacuum apparatus of the type wherein a container is divided into communicating high and low pressure chambers by a partition having an opening formed therein, a seal comprising a tubular member extending from the opening of said partition into the high pressure chamber, means positioned proximate the free end of said tubular member for ejecting a condensable fluid into the high pressure chamber to prevent the movement of gas from the high pressure chamber to the low pressure chamber, said high pressure chamber being provided with an inlet and an outlet for said condensable fluid.

2. A device in accordance with claim 1 wherein the condensable fluid is steam and means are provided in the high pressure chamber for condensing said steam after introduction to said chamber.

3. A device in accordance with claim 2 wherein means are provided in the low pressure chamber for condensing any steam entering therein from the high pressure chamber.

4. A device in accordance with claim 3 wherein a bypass from the high pressure chamber to the low pressure chamber is provided having steam ejecting means and steam condensing means to supplement the effectiveness of the seal between the chambers.

References Cited

UNITED STATES PATENTS

| 2,442,622 | 5/1948 | Starr | 277—68 X |
| 2,509,668 | 5/1950 | Berggren | 277—70 X |
| 2,678,838 | 5/1954 | Richardson et al. | 277—70 |

SAMUEL ROTHBERG, Primary Examiner

U.S. Cl. X.R.

227—135; 68—5